United States Patent
Furukawa et al.

(10) Patent No.: US 9,045,663 B2
(45) Date of Patent: *Jun. 2, 2015

(54) INK FOR INK-JET RECORDING APPARATUSES AND IMAGE FORMING METHOD

(71) Applicant: Kyocera Document Solutions Inc., Osaka (JP)

(72) Inventors: Noriaki Furukawa, Osaka (JP); Susumu Hiroshima, Osaka (JP); Takashi Somete, Osaka (JP); Yasuko Takaori, Osaka (JP)

(73) Assignee: KYOCERA DOCUMENT SOLUTIONS INC., Osaka-Shi (JP)

( * ) Notice: Subject to any disclaimer, the term of this patent is extended or adjusted under 35 U.S.C. 154(b) by 163 days.

This patent is subject to a terminal disclaimer.

(21) Appl. No.: 13/769,199

(22) Filed: Feb. 15, 2013

(65) Prior Publication Data

US 2013/0215169 A1 Aug. 22, 2013

(30) Foreign Application Priority Data

Feb. 17, 2012 (JP) ................... 2012-033010
Jan. 18, 2013 (JP) ................... 2013-007905

(51) Int. Cl.
 C09D 11/02 (2014.01)
 C09D 11/36 (2014.01)
 C09D 11/322 (2014.01)
 C09D 11/38 (2014.01)

(52) U.S. Cl.
 CPC .............. *C09D 11/36* (2013.01); *C09D 11/322* (2013.01); *C09D 11/38* (2013.01)

(58) Field of Classification Search
 USPC ......................................................... 347/100
 See application file for complete search history.

(56) References Cited

U.S. PATENT DOCUMENTS

| | | | |
|---|---|---|---|
| 5,667,569 A | 9/1997 | Fujioka | |
| 8,580,025 B2* | 11/2013 | Tateishi et al. ............. | 106/31.78 |
| 8,795,423 B2* | 8/2014 | Ozawa ........................ | 106/31.86 |
| 2013/0127953 A1* | 5/2013 | Furukawa et al. ............... | 347/68 |

FOREIGN PATENT DOCUMENTS

JP H09-012945 A 1/1997

* cited by examiner

*Primary Examiner* — Lamson Nguyen
(74) *Attorney, Agent, or Firm* — Knobbe Martens Olson & Bear LLP

(57) ABSTRACT

An ink for ink-jet recording apparatuses includes water, a pigment dispersion, an organic solvent, and a humectant. The pigment dispersion includes a pigment and a resin having a weight average molecular weight of from 35,000 to 140,000. An adsorbed resin proportion determined from the mass of a total amount of resin in the ink and the amount of resin separated from pigment among the resin is at least 0.97. And, the ink contains from 3% to 15% by mass of C1-C4 monoalkyl ether of polyhydric alcohol based on the mass of the ink as the organic solvent.

8 Claims, 6 Drawing Sheets

INK FOR INK-JET RECORDING APPARATUSES AND IMAGE FORMING METHOD

INCORPORATION BY REFERENCE

This application is based upon and claims the benefit of priority from the corresponding Japanese Patent Application Nos. 2012-033010 and 2013-007905 respectively filed in the Japan Patent Office on Feb. 17, 2012, and Jan. 18, 2013, the entire contents of which are incorporated herein by reference.

FIELD

The present disclosure relates to an ink for ink-jet recording apparatuses and an image forming method.

BACKGROUND

In recent years, highly precise and fine image quality comparative to silver salt photography can be taken along with rapid progress of recording technology; therefore, ink-jet recording apparatuses for forming images using an ink-jet recording system have been widely used as image forming apparatuses.

In these ink-jet recording apparatuses, there may arise ejection failure of an ink when forming images after the ink was not ejected from recording heads for a while. This is because when the ink is allowed to stand under a state filled in the recording heads, viscosity change of the ink occurs since evaporation occurs from the water of the ink near nozzles of the recording heads.

From such a circumstance, a water-based ink has been proposed for an ink for ink-jet recording apparatuses that includes from 5% to 15% by mass of a polyhydric alcohol monoalkyl ether having a vapor pressure of 0.1 mmHg or lower at 20° C. and from 5% to 50% by mass of a polyhydric alcohol as an organic solvent and that is allegedly excellent in ejection stability to form good images.

However, ejection failure may occur in the ink when forming images after the ink was not ejected for a while depending on the type of organic solvent used. There is another problem of disadvantageous satelliting tendency in the ink described above, i.e. minute satellite drops tend to fly together with main ink droplets (hereinafter, also referred to as "main drops") when ejecting ink droplets from nozzles in cases of forming images more rapidly. The ink with the disadvantageous satelliting tendency may cause image smear in resulting images.

Furthermore, the above-mentioned ink is designed to be resistant to dry in order to enhance ejection stability; therefore, when forming images more rapidly, recording media such as paper may be discharged through a pair of discharge rollers before the ink has sufficiently dried or the ink has penetrated into recording media, and thus the ink may adhere to discharge rollers (offset). When the offset occurs, the ink adhering to discharge rollers transfers to recording media, thus image defects are likely to occur in resulting images.

SUMMARY

An ink for ink-jet recording apparatuses according to an aspect of the present disclosure includes at least water, a pigment dispersion, an organic solvent, and a humectant. The pigment dispersion contains a pigment and a resin having a weight average molecular weight of from 35,000 to 140,000. An adsorbed resin proportion, determined in accordance with the following formula from the mass of a total amount of resin in the ink and the mass of resin separated from pigment among the resin, is at least 0.97:

Adsorbed resin proportion=1−(mass of free resin)/(mass of total resin).

The ink for ink-jet recording apparatuses contains from 3% to 15% by mass of C1-C4 monoalkyl ether of polyhydric alcohol based on the mass of the ink as the organic solvent.

In an image forming method according to another aspect of the present disclosure, images are formed using an ink-jet recording apparatus by the ink for ink-jet recording apparatuses described above.

DETAILED DESCRIPTION OF EMBODIMENTS

Figure 1:
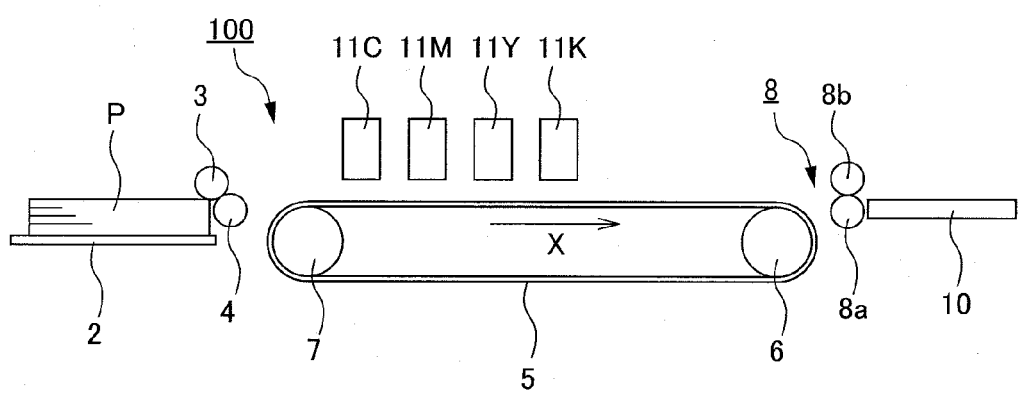
FIG. 1 shows a configuration of an ink-jet recording apparatus that employs a line head-type recording system.

The present disclosure is explained in detail with respect to embodiments below; however, the present disclosure is not limited at all to the embodiments below and may be carried out with appropriately making a change within the purpose of the present disclosure. In addition, explanation may be occasionally omitted with respect to duplicated matters; this does not however limit the gist of the present disclosure.

First Embodiment

A first embodiment relates to an ink for ink-jet recording apparatuses, that contains water, a pigment dispersion, an organic solvent, and a humectant. The pigment dispersion contains a pigment and a resin having a weight average molecular weight of from 35,000 to 140,000. The adsorbed resin proportion, determined from a total mass of resin in the ink and the mass of resin separated from the pigment among the resin, is at least 0.97. The ink for ink-jet recording apparatuses contains from 3% to 15% by mass of C1-C4 monoalkyl ether of polyhydric alcohol as the organic solvent.

The ink for ink-jet recording apparatuses according to the first embodiment (hereinafter, also simply referred to as "ink") may also contain a dissolution stabilizer that stabilizes the state of components dissolved in the ink, in addition to the water, the pigment, the resin, the organic solvent, and the humectant, as required. In the ink of the present disclosure, the pigment and the resin are included in the pigment dispersion. The water, the pigment dispersion, the pigment and the resin in the pigment dispersion, the humectant, the organic solvent, and the dissolution stabilizer, which are essential or optional components contained in the ink for ink-jet recording apparatuses of the present disclosure, as well as a method of producing the ink for ink-jet recording apparatuses and a image forming method are explained in order below.

Water

The ink for ink-jet recording apparatuses of the present disclosure is a water-based ink, and thus it necessarily contains water. The water in the ink is not particularly limited within a range not inhibiting the purpose of the present disclosure and water with a desired purity may be appropriately selected and employed from waters used in the production of conventional water-based inks. The content of the water in the ink for ink-jet recording apparatuses of the present disclosure is not particularly limited within a range not inhibiting the purpose of the present disclosure. The content of the water is appropriately adjusted depending on the amounts of other components used, as described later. Typically, the content of the water in the ink is preferably from 20% to 70% by mass and more preferably from 30% to 60% by mass based on the total mass of the ink.

Pigment Dispersion

The ink for ink-jet recording apparatuses of the present disclosure includes a pigment dispersion that contains the pigment as a colorant and the resin.

(Pigment)

The pigment in the pigment dispersion is not particularly limited within a range not inhibiting the purpose of the present disclosure, and it may be appropriately selected and used from pigments used as a colorant in conventional inks for ink-jet recording apparatuses. Specific examples of the pigment may be exemplified by yellow pigments such as C.I. pigment yellows 74, 93, 95, 109, 110, 120, 128, 138, 139, 151, 154, 155, 173, 180, 185, and 193; orange pigments such as C.I. pigment oranges 34, 36, 43, 61, 63, and 71; red pigments such as C.I. pigment reds 122 and 202; blue pigments such as C.I. pigment blues 15 and 15:3; violet pigments such as C.I. pigment violets 19, 23, and 33; and black pigments such as C.I. pigment black 7.

The amount of the pigment used is preferably from 4% to 9.5% by mass based on the total mass of the ink. When using an ink prepared from a pigment dispersion of which the amount of the pigment used is excessively small, it may be difficult to form images with a desired image density. When using an ink prepared from a pigment dispersion of which the amount of the pigment used is excessively large, flowability of the ink may be impaired to result in resistance to form images with a desired image density or permeability of the ink into recording media may be impaired to result in occurrences of offset.

Volume average particle diameter D50 of the pigment in the pigment dispersion is preferably from 30 nm to 200 nm and more preferably from 70 nm to 130 nm from the viewpoint of ink properties such as color density, hue, and ink stability. The volume average particle diameter D50 of the pigment may be controlled by adjusting a particle diameter of beads, processing time, etc. in a process of kneading the pigment and the resin. When using an ink prepared from the pigment dispersion containing a pigment having an excessively small volume average particle diameter D50, the image density of resulting images may be lower than a desired value. When using an ink prepared from the pigment dispersion containing a pigment having an excessively large volume average particle diameter D50, clogging of nozzles for ejecting the ink may occur and ejection characteristics of the ink may degrade. The volume average particle diameter D50 of the pigment can be measured using a device such as a dynamic light scattering particle size distribution analyzer (by Sysmex Co.) for a sample which is prepared by diluting the pigment dispersion to 500 times with ion-exchange water.

(Resin)

The resin in the pigment dispersion is not particularly limited within a range not inhibiting the purpose of the present disclosure, and it can be appropriately selected and used from various resins used in the production of conventional pigment dispersions. Specific examples of preferable resins may be exemplified by styrene-acrylic acid-acrylic acid alkyl ester copolymers, styrene-methacrylic acid-methacrylic acid alkyl ester-acrylic acid alkyl ester copolymers, styrene-acrylic acid copolymers, styrene-maleic acid copolymers, styrene-maleic acid-acrylic acid alkyl ester copolymers, styrene-methacrylic acid copolymers, styrene-methacrylic acid alkyl ester copolymers, styrene-maleic acid half ester copolymers, vinylnaphthalene-acrylic acid copolymers, and vinylnaphthalene-maleic acid copolymers. Among these resins, in view of easy preparation and excellent effects in dispersing pigments, preferable are styrene-acrylic resins that include a unit derived from styrene and a unit derived from acrylic acid, methacrylic acid, acrylic acid ester, or methacrylic acid ester such as styrene-acrylic acid-acrylic acid alkyl ester copolymers, styrene-methacrylic acid-methacrylic acid alkyl ester-acrylic acid alkyl ester copolymers, styrene-acrylic acid copolymers, styrene-maleic acid-acrylic acid alkyl ester copolymers, styrene-methacrylic acid copolymers, and styrene-methacrylic acid alkyl ester copolymers.

The pigment dispersion in the ink for ink-jet recording apparatuses of the present disclosure contains a resin having a weight average molecular weight of from 35,000 to 140,000. The molecular weight of the resin in the pigment dispersion is a weight average molecular weight (Mw), and it can be measured using gel filtration chromatography. When using an ink prepared from a pigment dispersion containing a resin having an excessively small molecular weight, it is difficult to suppress the viscosity change of the ink in cases of exposing the ink to a high-temperature environment for a long time. When using an ink prepared from a pigment dispersion containing a resin having an excessively large molecular weight, the viscosity of the ink tends to increase, thus ejection failure of the ink is likely to occur when forming images after the ink was not ejected for a while from recording heads. The molecular weight of the resin can be controlled by a conventional method to adjust polymerization conditions such as an amount of polymerization initiator used, polymerization temperature, and polymerization time when producing the resin through a polymerization reaction. Specifically, it is preferred that the amount of polymerization initiator is adjusted within a range of preferably from 0.001 mole to 5 moles and more preferably from 0.01 mole to 2 moles per 1 mole of monomer mixture, the solvent amount is appropriately adjusted, the polymerization temperature is adjusted within a range of from 50° C. to 80° C., the polymerization time is adjusted within a range of from 10 hours to 24 hours, or the like.

More specifically, the method of preparing a styrene-acrylic resin having a molecular weight of 20,000 and an acid value of 100 mg KOH/g is as follows. Initially, 100 g of isopropyl alcohol and 250 g of methyl ethyl ketone are added to a 1000 mL four-necked flask equipped with a stirrer, a nitrogen introduction tube, a condenser, and a dropping funnel. A mixture solution of 40 g of methyl methacrylate, 40 g of styrene, 10 g of butyl acrylate, 10 g of methacrylic acid, and 0.3 g of azobisisobutyronitrile (AIBN) as an initiator is introduced into the dropping funnel, and the mixture solution is added drop-wise over about 2 hours into the solvent in the flask heated and refluxed at 70° C. under nitrogen atmosphere. After adding drop-wise, the reactant in the flask is further heated and refluxed over 6 hours, and a solution of 0.1 g of AIBN in 150 g of methyl ethyl ketone is added drop-wise over 15 minutes. Thereafter, the reactant in the flask is heated and refluxed for 5 hours, thereby obtaining a styrene-acrylic resin of molecular weight 20,000 and acid value 100 mg KOH/g.

When adjusting the molecular weight, the styrene-acrylic resin with a molecular weight of 30,000 can be prepared by a method where 70% of the amount of the initiator in the example described above is removed, a method where the solvent is altered and the heating/refluxing temperature in the example is changed to 80° C., etc. The styrene-acrylic resin with a molecular weight of 70,000 can be prepared by a method where the amount of the solvent in the example described above is reduced to half (50 g of isopropyl alcohol, 150 g of methyl ethyl ketone), a method where the amount of the initiator is reduced, etc. When reducing the amount of the initiator, the polymerization reaction of the reactants may stop and residual monomers may increase, therefore the amount of initiator is decided considering the amount of residual monomers. When preparing the resin, 2-mercapto ethanol may also be added in a minute amount (0.001 mole or less per 1 mole of monomer mixture) as a chain-transfer agent to reaction liquid.

The acid value of the resin used in the preparation of the pigment dispersion is preferably from 50 to 200 mg KOH/g. In cases of using an ink prepared from the pigment dispersion containing a resin of which the acid value is excessively small, the dispersibility of the pigment in the pigment dispersion tends to be poor and thus it becomes difficult to prepare fine particles of the pigment. For this reason, the resulting images may not exhibit favorable colorability or chromogenic property. In cases of using an ink prepared from the pigment dispersion containing a resin of which the acid value of the resin is excessively large, storage stability of the ink is likely to be poor. The acid value of the resin can be controlled by appropriately adjusting the amount of monomers such as acrylic acid and methacrylic acid having an acidic functional group when synthesizing the resin. Specifically, the acid value of the resin can be raised by increasing the amount of monomers having an acidic functional group.

The amount of the resin used when preparing the pigment dispersion is not particularly limited within a range not inhibiting the purpose of the present disclosure. Typically, the resin is used in an amount within the range of from 30 to 70 parts by mass based on 100 parts by mass of the pigment.

(Method of Preparing Pigment Dispersion)

The method of preparing the pigment dispersion containing the pigment and the resin is not particularly limited within a range not inhibiting the purpose of the present disclosure, and it can be appropriately selected from conventional methods. A favorable method may be exemplified by a method where the pigment and the resin are kneaded in a suitable liquid medium like water using a wet-type media disperser such as a Nano Grain Mill (by Asada Tekko), an MSC Mill (by Mitsui Mining Co.), and a Dyno Mill (by Shinmaru Enterprises Co.) to prepare the pigment dispersion. Beads with a small diameter are used in the processing where the wet-type media disperser is employed. The particle diameter of the beads is not particularly limited; typically, the particle diameter is from 0.5 mm to 1.0 mm. The material of the beads is not particularly limited, and a hard material such as zirconia may be used.

The amount of liquid medium used to prepare the pigment dispersion is not particularly limited as long as the pigment and resin can be favorably kneaded. Typically, the mass amount of liquid medium used is preferably from 1 to 10 times and more preferably from 2 to 8 times based on the total mass of the pigment and the resin.

Organic Solvent

The ink of the present disclosure contains at least C1-C4 monoalkyl ether of polyhydric alcohol as the organic solvent. Specific examples of the C1-C4 monoalkyl ether of polyhydric alcohol may be exemplified by monoalkyl glycol ethers such as ethylene glycol monobutyl ether, triethylene glycol monomethyl ether, triethylene glycol monobutyl ether, diethylene glycol monomethyl ether, and ethylene glycol monomethyl ether. Among these, one or more selected from the group consisting of triethylene glycol monobutyl ether, triethylene glycol monomethyl ether, and tripropylene glycol monomethyl ether are preferable as the C1-C4 monoalkyl ether of polyhydric alcohol. All of triethylene glycol monobutyl ether, triethylene glycol monomethyl ether, and tripropylene glycol monomethyl ether have lower vapor pressure at room temperature; therefore, odor problems are unlikely to occur even when included in the ink as the organic solvent.

The content of the C1-C4 monoalkyl ether of polyhydric alcohol is from 3% to 15% by mass in the ink. When an ink with an excessively small content of the C1-C4 monoalkyl ether of polyhydric alcohol is used, viscosity of the ink tends to increase, and ejection failure of the ink is likely to occur when forming images after the ink was not ejected for a while from recording heads. When the ink with an excessively small content of the C1-C4 monoalkyl ether of polyhydric alcohol is used, recording media is likely to be smeared due to offset since the ink is resistant to penetrate into the recording media. When an ink with an excessively large content of the C1-C4 monoalkyl ether of polyhydric alcohol is used, it is difficult to suppress the viscosity change of the ink in cases of exposing the ink to a high-temperature environment for a long time.

The ink of the present disclosure may contain an organic solvent other than the organic solvents described above within a range that does not inhibit the purpose of the present disclosure in order to adjust the permeability of the ink into recording media. Specific examples of the organic solvent, compoundable with the ink, other than the organic solvents described above may be exemplified by alkane diols of from 6 to 9 carbon atoms such as 1,2-octane diol and 2,4-diethyl-1,5-pentanediol. These organic solvents may be used alone or in a combination of two or more. When the ink contains an organic solvent like alkane diols of from 6 to 9 carbon atoms such as 1,2-octanediol and 2,4-diethyl-1,5-pentanediol, the content is preferably from 0.1% to 2.0% by mass and more preferably from 0.5% to 1.5% by mass based on the total mass of the ink.

Humectant

The ink of the present disclosure contains the humectant in order to stabilize the viscosity of the ink by suppressing vaporization of liquid components from the ink. Specific examples of the humectant may be exemplified by glycerin, polyethylene glycol, polypropylene glycol, ethylene glycol, propylene glycol, butylene glycol, diethylene glycol, dipropylene glycol, triethylene glycol, tripropylene glycol, 1,2,6-hexanetriol, thiodigylcol, 1,3-propanediol, 1,3-butanediol, and 1,5-pentanediol. These humectants may be used in a combination of two or more.

Among these, the humectant in the ink of the present disclosure is preferably glycerin and 1,3-propanediol. By use of glycerin and 1,3-propanediol as the humectant, moisture-retaining property of the ink can be improved and thus viscosity of the ink can be stabilized by suppressing the vaporization of liquid components from the ink.

Here, by including glycerin into the ink, moisture-retaining property of the ink can be imparted thereto and also viscosity of the ink is increased. Therefore, a mass ratio (P/Q) of glycerin content (P) to 1,3-propanediol content (Q) is preferably from 0.25 to 1.00. When an ink having a mass ratio (P/Q) of greater than 1.00 is used, the content of glycerin is relatively large in the ink. Therefore, the ink tends to increase its viscosity and thus ejection failure of the ink is likely to occur when forming images after the ink was not ejected for a while from recording heads. On the other hand, when an ink having a mass ratio (P/Q) of less than 0.25 is used, the content of glycerin is relatively small in the ink. Therefore, moisture-retaining property of the ink becomes lower, thus the solvent of the ink tends to evaporate when the ink is not ejected for a while from recording heads.

The content of the humectant in the ink is preferably from 5% to 60% by mass and more preferably from 10% to 50% by mass based on the total mass of the ink.

When an ink with an excessively small content of the humectant is used, the solvent of the ink tends to evaporate due to lower moisture-retaining property thereof when the ink is not ejected for a while from recording heads. Furthermore, when the ink with an excessively small content of the humectant is used, the viscosity of the ink tends to increase due to evaporation of the solvent. Therefore, ejection failure of the ink is likely to occur when forming images after the ink was not ejected for a while from recording heads. Moreover, when the ink with an excessively small content of the humectant is used, materials in the ink are resistant to be stably dispersed into the ink, thus viscosity increase of the ink tends to occur in cases of exposing the ink to a high-temperature environment for a long time. When an ink with an excessively large content of the humectant is used, the viscosity of the ink tends to increase during solvent evaporation from the ink in comparison to the cases of using the ink with an excessively small content of the humectant. Therefore, ejection failure of the ink is likely to occur when forming images after the ink was not ejected for a while from recording heads.

Dissolution Stabilizer

The dissolution stabilizer is a component that stabilizes a state of dissolved ink by compatibilizing the components in the ink. Specific examples of the dissolution stabilizer may be exemplified by 2-pyrrolidone, N-methyl-2-pyrrolidone, and γ-butyrolactone. These dissolution stabilizers may be used in a combination of two or more. When the ink contains the dissolution stabilizer, the content of the dissolution stabilizer is preferably from 1% to 20% by mass and more preferably from 3% to 15% by mass based on the total mass of the ink.

Method of Producing Ink for Ink-Jet Recording Apparatuses

The method of producing the ink for ink-jet recording apparatuses of the present disclosure is not particularly limited as long as the method is capable of uniformly mixing the pigment dispersion where the resin and the pigment are dispersed in the solvent, water, the humectant, and the organic solvent as essential components, and also optional component such as the dissolution stabilizer as required. A specific example of the method for producing the ink for ink-jet recording apparatuses may be exemplified by a method of uniformly mixing every component of the ink by using a mixer and then removing foreign matters and coarse particles by use of a filter with a pore size of 10 μm or less. In addition, when producing the ink, various conventional additives that have been added to inks for ink-jet recording apparatuses such as dissolution stabilizers, surfactants, anti-oxidants, viscosity modifiers, pH adjusters, and antisepsis/antifungal agents may be added thereto, as required.

Furthermore, in the ink for ink-jet recording apparatuses of the present disclosure, the adsorbed resin proportion, determined in accordance with the following formula from the mass of a total amount of the resin in the ink and the mass of resin separated from pigment among the resin, is at least 0.97:

Adsorbed resin proportion=1−(mass of free resin)/(mass of total resin).

By adjusting the adsorbed resin proportion within the range, even when ink droplets have been dried on recording media and fresh ink droplets are ejected onto the dried sites, the newly landing ink droplets are unlikely to be disturbed to penetrate into the recording media, consequently, occurrence of offset may be suppressed. When using the ink with an adsorbed resin proportion of less than 0.97, penetration of ink droplets into recording media is likely to be disturbed due to increase of free resin in the ink. It becomes therefore difficult to suppress occurrence of offset. The adsorbed resin proportion of the pigment dispersion may be similarly calculated from the mass of the free resin in the pigment dispersion and the total mass of the resin in accordance with the formula described above.

The mass of the free resin in the ink can be measured using the following method.

Method of Measuring Mass of Free Resin

The ink is placed in a predetermined container, and the ink is centrifuged for 24 hours under the condition of a revolution speed of 5000 rpm using a centrifuge (NS-C100, by Nano Seeds Co.). The solid content containing a free resin as the main component is taken by collecting the entire amount of transparent supernatant of the ink in the container, and drying the supernatant at 150° C. under a reduced pressure of 0.67 Pa. The mass of the free resin in the ink is calculated in accordance with the following formula of Wi (g) and Wr (g), in which the mass of the ink in the centrifuge is Wi (g), and Wr (g) is determined by measuring the mass of solid content resulting from drying the supernatant and measuring the mass of components not volatilizing under the drying condition among the components like surfactant, anti-oxidant, viscosity modifier, pH adjuster and antisepsis/antifungal agent in the ink, and then subtracting the latter mass from the former mass.

Mass of free resin(% by mass)=(Wr/Wi)×100

The method of adjusting the mass of free resin in the ink may be exemplified by a method of adjusting a resin amount when preparing the pigment dispersion; a method of adjusting a specific surface area of a pigment in the pigment dispersion by modifying the dispersion conditions and thereby adjusting the resin amount adsorbed to the pigment, when preparing the pigment dispersion; a method of preparing the ink by precipitating a pigment through centrifuging the ink, substituting at least a part of the supernatant with a non-resin liquid component of the ink, and then dispersing the precipitated pigment again; and the like.

The mass of free resin in the pigment dispersion can also be adjusted by centrifuging the pigment dispersion using the above-mentioned method, and replacing the supernatant containing a separated free resin with an equivalent amount of water.

By use of the ink for ink-jet recording apparatuses according to the first embodiment explained above, ejection failure of the ink can be suppressed when forming images after the ink was not ejected for a while from recording heads, occurrence of image smear due to flying of satellite drops can be suppressed, and viscosity change in cases of exposing the ink to a high-temperature environment for a long time can be suppressed. For this reason, the ink for ink-jet recording apparatuses according to the first embodiment can be properly used in various ink-jet recording apparatuses.

Second Embodiment

The second embodiment relates to an image forming method for forming an image using the ink for ink-jet recording apparatuses according to the first embodiment by an ink-jet recording apparatus. The recording system of the ink-jet recording apparatus, used in the image forming method according to the second embodiment, is not particularly limited and may be a serial type in which recording is performed while scanning a recording head over a recording medium or a line head-type in which recording is performed using a recording head fixed to an apparatus main body. The recording system of the ink-jet recording apparatus, used in the image forming method according to the second embodiment, is preferably a line head-type from the viewpoint of higher speed in forming images.

Figure 2:
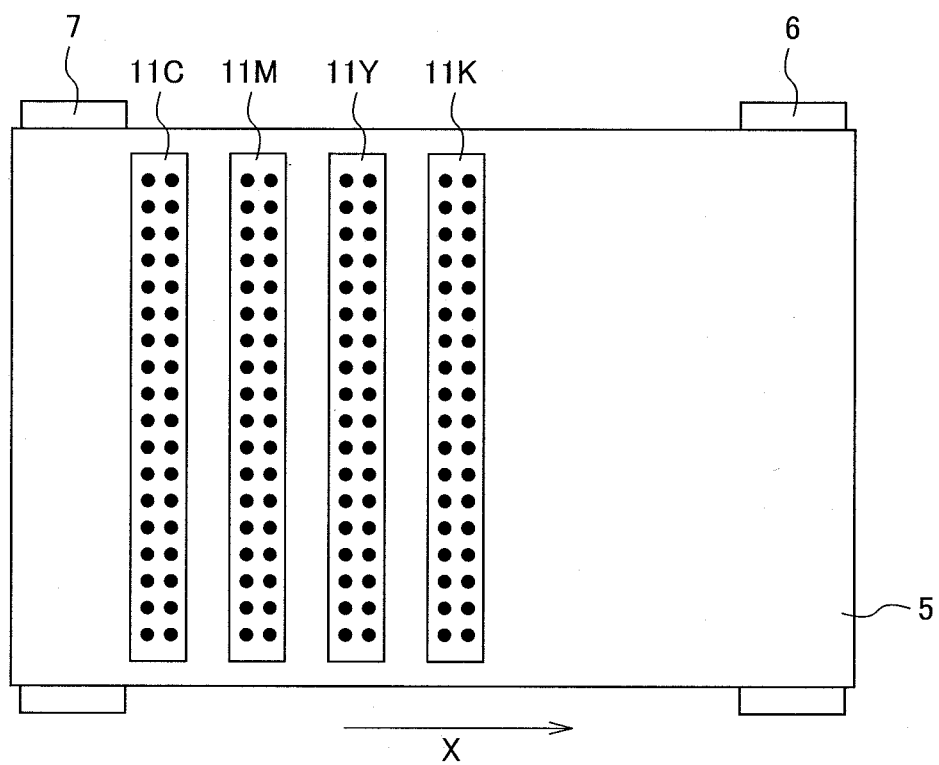
FIG. 2 is a view in which a conveyor belt of the ink-jet recording apparatus shown in FIG. 1 is viewed from above.

The image forming method of the second embodiment is explained with respect to the case of using a line head-type ink-jet recording apparatus where a recording paper is used as a recording medium with reference to figures below. FIG. 1 is a cross-sectional view showing the configuration of a line head-type ink-jet recording apparatus; and FIG. 2 is a view of a conveyor belt, of the ink-jet recording apparatus shown in FIG. 1, viewed from above.

As shown in FIG. 1, a paper feed tray 2 (paper feed portion), where a recording paper P is stored, is provided on a left side of an ink-jet recording apparatus 100; and there are provided a paper feed roller 3 that feeds and conveys an uppermost recording paper P one by one in sequence to a conveyor belt 5 and a driven roller 4 that pressure-contacts with the paper feed roller 3 and is rotationally driven, at one end of the paper feed tray 2.

The conveyor belt 5 for conveying the recording paper P is rotatably arranged at a downstream side in a paper conveying direction (right side in FIG. 1) of the paper feed roller 3 and the driven roller 4. The conveyor belt 5 is stretched over a belt drive roller 6 that is arranged and rotated at the downstream side in the paper conveying direction and a belt roller 7 that is arranged at an upstream side and driven-rotated with the belt drive roller 6 through the conveyor belt 5. The recording paper P, supported by the conveyor belt 5, is conveyed to the direction of arrow X by rotationally driving the belt drive roller 6 to the clockwise direction. Preferably, the recording paper P is conveyed at a speed of at least 50 m/min.

The belt drive roller 6 is arranged at a downstream side in the paper conveying direction X, thereby the paper feeding side (upwards in FIG. 1) of the conveyor belt 5 is pulled by the belt drive roller 6. Consequently, belt tension can be applied, and thus the recording paper P can be stably conveyed. Here, a sheet of a dielectric resin is used for the conveyor belt 5, and a belt without seams (seamless) is preferably used.

At the downstream side in the paper conveying direction X of the conveyor belt 5, there are also provided a discharge roller 8a that is driven in the clockwise direction to discharge the recoding paper P with a recorded image out of the apparatus main body and a driven roller 8b that is in pressure-contact with the top of the discharge roller 8a and is rotationally driven. A paper ejection tray 10, on which the recording paper P discharged out of the apparatus main body is stacked, is also provided at the downstream side in the paper conveying direction X of the discharge roller 8a and the driven roller 8b.

Since the driven roller 8b directly contacts the image surface of the recording paper P, the material of the surface of the driven roller 8b is preferably a water-repellent material. Adhesion of ink, which has not penetrated into the recording paper, to rollers can be suppressed by making the surface of the driven roller 8b from the water-repellent material. Consequently, occurrence of offset tends to be suppressed. The preferable water-repellent material may be exemplified by fluorine resins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkyl vinyl ether copolymers, polychlorotrifluoroethylene, chlorotrifluoroethylene-ethylene copolymers, chlorotrifluoroethylene-vinylidene fluoride copolymers, polyvinylidene fluoride and polyvinyl fluoride. Similarly to the driven roller 8b, the surface of the components directly contacting the image forming surface of the recording paper P is preferably made of the water-repellent material.

Above the conveyor belt 5, there are provided line heads 11C, 11M, 11Y, and 11K which are supported at a height such that a predetermined interval is maintained from the top surface of the conveyor belt 5 and which perform recording of images on the recording paper P conveyed on the conveyor belt 5. Colored inks of four different colors (cyan, magenta, yellow, and black) are filled in these line heads 11C to 11K respectively, and color images are formed on the recording paper P by ejecting the respective color inks from each of the line heads 11C to 11K.

In order to downsize the apparatus, preferably, the period starting from the time when the ink droplets ejected from each of the line heads 11C to 11K have landed on the recording paper P until the time when the ink landing locations on the recording paper P have reached to the discharge portion 8, consisting of the discharge roller 8a and the driven roller 8b to eject the recording paper P, is within 1 second.

Furthermore, the amount of ejected ink that has been ejected from line heads and has landed on the recording paper P (hereinafter, simply referred to as "amount of landed ink") is preferably 7.0 $g/m^2$ or less per color and more preferably 6.0 $g/m^2$ or less when forming monochromatic images. When forming images by four colors (cyan, magenta, yellow, and black), the amount is preferably 18.0 $g/m^2$ or less and more preferably 16.0 $g/m^2$ or less per four colors. Rapid image formation may be allowed while suppressing the occurrence of offset in resulting images by adjusting the amount of ejected ink within this range.

As shown in FIG. 2, these line heads 11C to 11K include nozzle arrays where a plurality of nozzles are arranged in a direction perpendicular to the paper conveying direction X (vertical direction in FIG. 2) and have a recording area of at least the width of the recording paper P, thereby allowing to form one-line images at once on the recording paper P conveyed by the conveying belt 5.

Here, in the line head-type ink-jet recording apparatus of this embodiment, the line heads are configured to have a recording area of at least the width of the recording paper P by way of aligning a plurality of nozzles in the longitudinal direction of a long head body that is no shorter than the width of the conveyor belt 5. In this connection, the line heads may be configured such that two or more short head units, each having two or more nozzles, are aligned in the width direction of the conveyor belt 5 to record images over the entire width of the recording paper P.

Various systems may also be employed for the ink ejection system of the line heads 11C to 11K such as a piezoelectric element system for ejecting ink droplets by using pressure occurring in liquid chambers of the line heads 11C to 11K using a piezoelectric element (piezo element), a thermal ink-jet system for causing air bubbles to increase in pressure using a heating element to eject ink droplets, and the like. The ink ejection system is preferably a piezoelectric element system in which ink droplets are ejected by using pressure occurring in a liquid chamber by controlling a voltage applied to a piezoelectric element since the control of the amount of ejected ink is easy.

Figure 3:
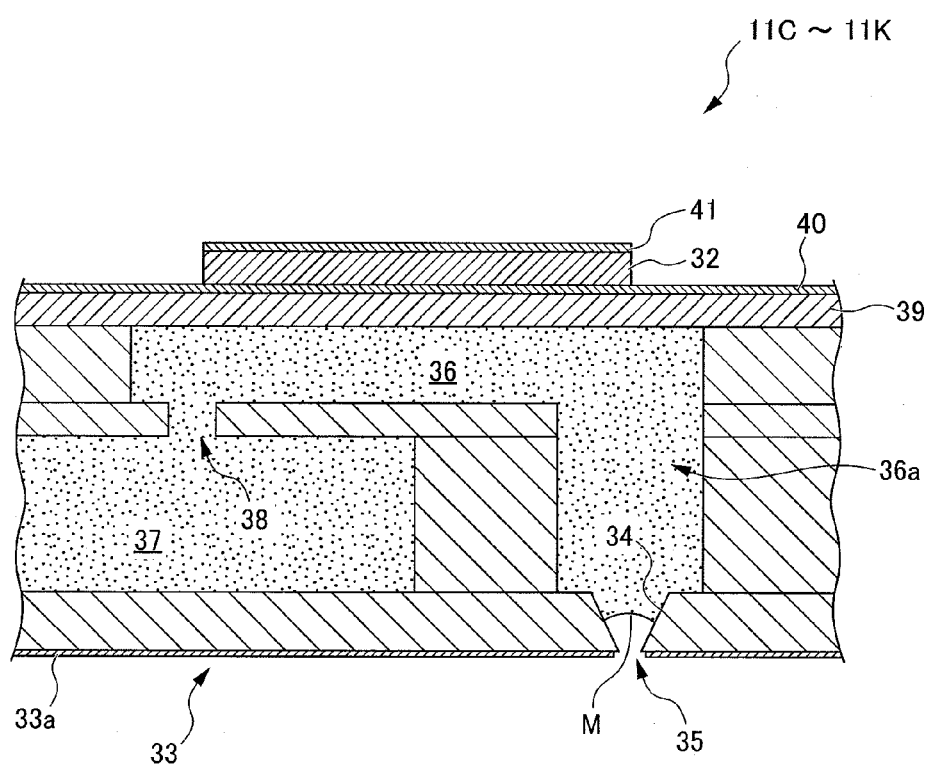
FIG. 3 is a cross-sectional view of a line head using a piezoelectric element system.

The line heads 11C to 11K using the piezoelectric element system are explained in detail below. FIG. 3 shows a cross-sectional view of the line heads 11C to 11K. As shown in FIG. 3, the line heads 11C to 11K using the piezoelectric element system may be equipped with a water-repellent film 33a that covers the portions other than the ink ejection hole 35 of an ejection surface 33, a pressure chamber 36 provided for each ink ejection hole 35, an ink bath (not shown) to reserve an ink, and a common channel 37 that supplies an ink from the ink bath to a plurality of pressure chambers 36. The pressure chamber 36 and the common channel 37 are connected by a supply hole 38, and an ink is supplied from the common channel 37 to the pressure chamber 36 through the supply hole 38.

The nozzle 34 and the pressure chamber 36 are connected by a nozzle channel 36a. The wall of the pressure chamber 36 opposite to the ejection surface 33 is formed from a vibration plate 39, and the vibration plate 39 is sequentially formed across a plurality of pressure chambers 36. A common electrode 40, similarly sequentially formed across a plurality of pressure chambers 36, is laminated on the vibration plate 39. The piezoelectric element 32 is provided on the common electrode 40 for each pressure chamber 36, and an electrode 41 is provided on the pressure chamber 36 to sandwich the piezoelectric element 32 together with the common electrode 40.

The ink is ejected from the nozzle 34 onto the recording paper P by applying an ejection signal described later, and the ink exists in the pressure chamber 36 even when ink droplets are not ejected and the ink forms a meniscus surface M near the ink ejection hole 35.

In the ink-jet recording apparatus used for the image forming method of the present disclosure, preferably, a meniscus vibration is performed in a way that the meniscus surface M formed near the ink ejection hole 35 of nozzles 34 of line heads 11C to 11K is vibrated by controlling a voltage applied to the piezoelectric element 32 at a level less than ejection. A series of steps concerning the vibration of the meniscus surface M by the meniscus vibration is explained below.

Figure 4:
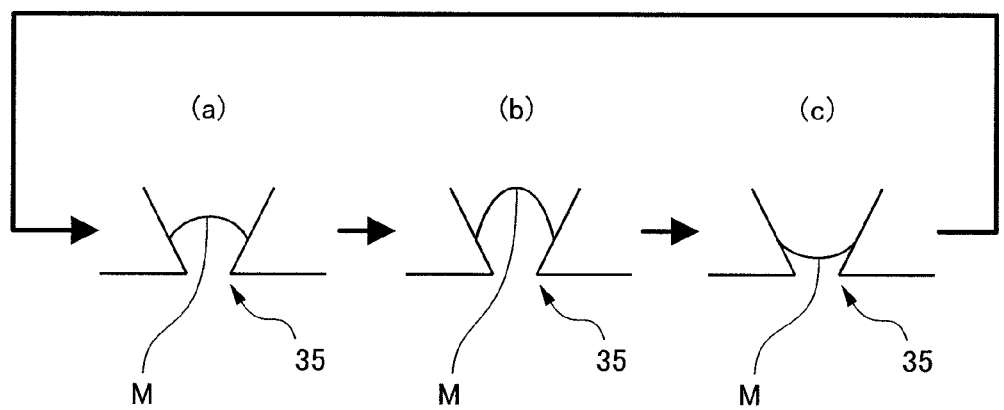
FIG. 4 shows vibrating steps of a meniscus surface under meniscus vibration.

FIG. 4 is a view showing vibrating steps of a meniscus surface M under the meniscus vibration. Initially, the meniscus surface M near the ink ejection hole 35 under a rest state as shown in the state (a) in FIG. 4 is pulled into the pressure chamber 36 by applying a drive voltage to the piezoelectric element 32 as shown in the state (b) in FIG. 4. Subsequently, application of the drive voltage is finished, then the meniscus surface M swells outward of the pressure chamber 36 as shown in the state (c) in FIG. 4 by back action of being pulled into the pressure chamber 36. In this way, the meniscus surface M vibrates without ejecting the ink, and the vibration is repeated two or more times while gradually reducing the vibration amplitude, converging into the rest state as shown in the state (a) in FIG. 4. Consequently, one time of the meniscus vibration is performed through a series of steps as shown in the states (a) to (c) in FIG. 4 by applying once the drive voltage to the piezoelectric element 32. Here, the vibration times and the period until the meniscus surface M converges to the rest state after applying once the drive voltage to the piezoelectric element 32 depend on conditions such as viscosity and temperature of the ink. In addition, until the vibration of the meniscus surface M performed by the former application of the drive voltage converges to the rest state, fresh meniscus vibration may be started based on next application of the drive voltage.

The meniscus vibration is performed based on a control signal capable of performing the meniscus vibration (hereinafter, referred to as "meniscus vibration signal") that is transmitted from the controlling part 20 (see FIG. 5) to the line head controlling circuit 26 (see FIG. 5). When the meniscus vibration signal is applied from the controlling part 20, the line head controlling circuit 26 applies the drive voltage to perform the meniscus vibration to the piezoelectric element 32. In this way, the controlling part 20 (see FIG. 5) can perform the meniscus vibration by transmitting the meniscus vibration signal. Furthermore, two or more pulses of the drive voltage applied to the piezoelectric element 32 may be included in one meniscus vibration signal; preferably, 1 to 5 pulses are included. Here, the meniscus vibration can be performed by merely changing a pulse width of the drive voltage applied to the piezoelectric element 32 using the drive circuit the same as that for ejecting ink droplets from the nozzle (see Japanese Patent No. 4,541,856, paragraph 0052). The frequency of the meniscus vibration signal transmitted from the controlling part 20 is not particularly limited, and the piezoelectric element 32 may be voltage controlled by a drive voltage of a frequency of from 10 kHz to 50 kHz.

It is also preferred that the meniscus vibration is performed at least before ink ejection. By performing the meniscus vibration before ink ejection, the ink near the ink ejection hole 35 that has not been ejected until then and thickened due to solvent evaporation and the ink in the pressure chamber 36 of the line heads 11C to 11K are stirred, thereby the ink in the pressure chamber 36 and the ink near the ink ejection hole 35 of the nozzle can be made uniform. By this action, the viscosity of the ink near the ink ejection hole 35 can be reduced, thus ejection failure of the ink can be suppressed when forming images.

More specifically, the meniscus vibration is preferably performed one or more times before forming an image on the recording paper P (while all line heads 11C to 11K do not eject the ink) and/or just before the ink ejection. When the meniscus vibration is performed before forming an image on the recording paper P, the meniscus vibration signal is preferably applied from 300 to 2,000 times in series. On the other hand, when the meniscus vibration is performed just before the ink ejection, the meniscus vibration signal is preferably applied from 10 to 500 times and more preferably from 5 to 300 times in series. Here, in regards to the meniscus vibration before forming an image on the recording paper P and the meniscus vibration just before the ink ejection, either of both may be performed or both may be performed. Furthermore, when the meniscus vibration is performed before forming an image on the recording paper P and/or just before the ink ejection, the meniscus vibration signal can be transmitted together with the control signal for image formation that is transmitted from the controlling part 20 (see FIG. 5) to the line head controlling circuit 26 (see FIG. 5).

Here, the ink thickening that occurs near the ink ejection hole 35 happens from the fact that the solvent in the ink volatilizes from the meniscus surface M, and the amount of volatilizing solvent is reduced as the volatilization of the solvent from the meniscus surface M progresses. Therefore, when the meniscus vibration is excessively performed, the ink tends to be entirely thickened. For this reason, when images are formed sequentially on two or more recording paper P and the meniscus vibration is performed before forming an image on the recording paper P, preferably, the meniscus vibration is performed only before forming an image on the first recording paper P when forming images sequentially. By this way, the thickening of entire ink caused by excessively performing the meniscus vibration can be suppressed and ejection failure of the ink can be suppressed when forming images.

Figure 5:
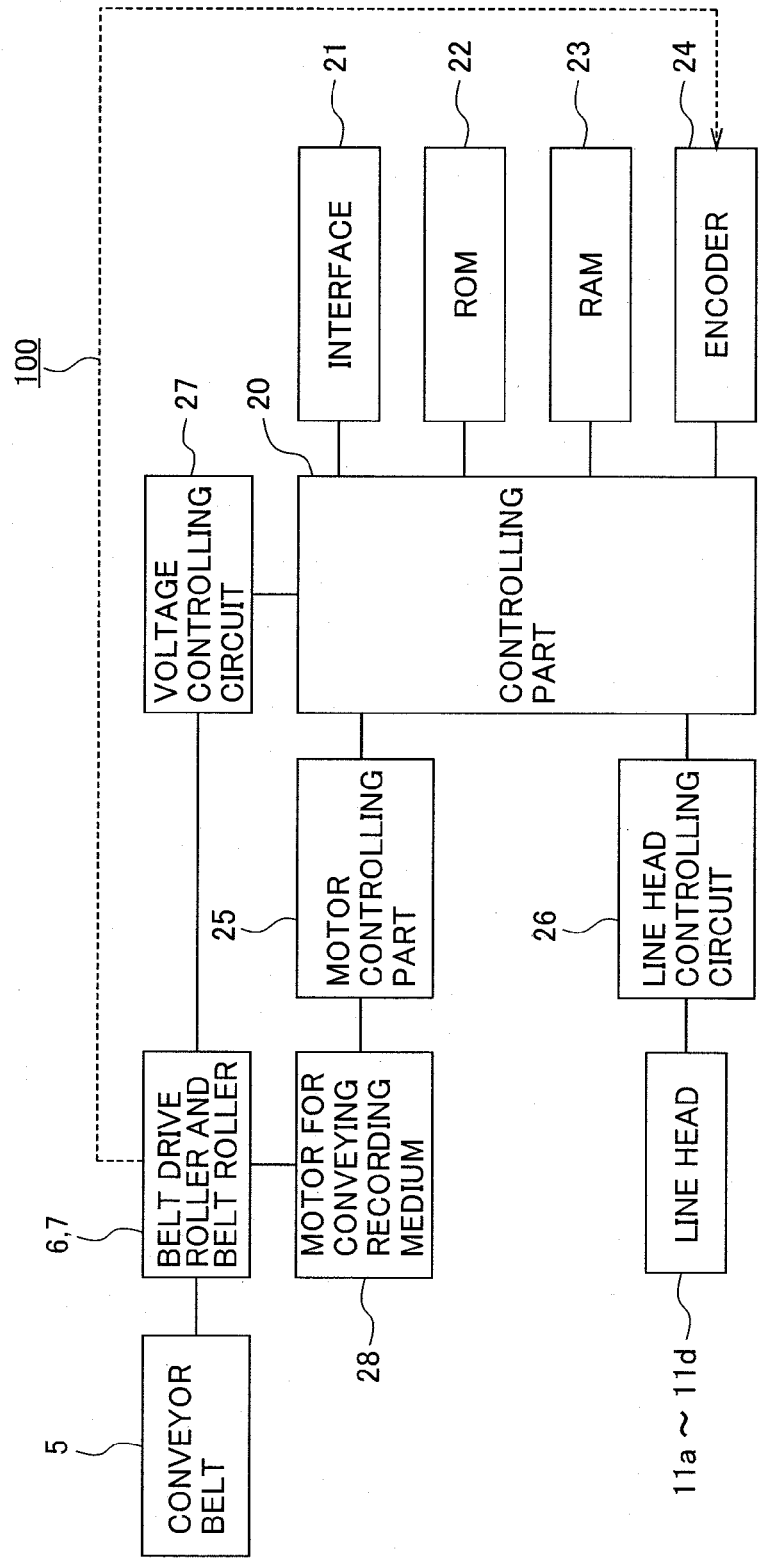
FIG. 5 is a block view showing a configuration of a line head-type ink-jet recording apparatus.

FIG. 5 is a block view showing a configuration of a line head-type ink-jet recording apparatus. The portions common between FIG. 1 and FIG. 2 are marked with an identical symbol and duplicated explanations thereof are omitted. The ink-jet recording apparatus 100 is equipped with a controlling part 20, and an interface 21, a ROM 22, a RAM 23, an encoder 24, a motor controlling circuit 25, a line head controlling circuit 26, and a voltage controlling circuit 27 are connected to the controlling part 20.

The interface 21 transmits and receives data between a host device such as a personal computer (not shown). The controlling part 20 converts an image signal received via the interface 21 into image data by conducting magnification-changing processing or gradation processing as required. Then control signals are output to various controlling circuits described later. When the meniscus vibration is performed, the controlling part 20 outputs the meniscus vibration signal to the line head controlling circuit 26 and the voltage applied to the piezoelectric element 32 is controlled based on the output signal, thereby the meniscus vibration can be performed such that the ink meniscuses formed near the ink ejection holes 35 of two or more nozzles of the line heads 11C to 11K are vibrated one or more times at a level less than ejection.

The ROM 22 stores a program such as a control program for forming an image by driving the line heads 11C to 11K. The RAM 23 stores image data, having been magnification-changing processed or gradation processed by the controlling part 20, in a predetermined region.

The encoder 24 is connected to the belt drive roller 6 on a paper ejection side of driving the conveyor belt 5, and outputs a pulse train depending on the rotational displacement amount of the rotation axis of the belt drive roller 6. The controlling part 20 calculates the amount of rotation by counting the number of pulses sent from the encoder 24 to confirm the feed amount of the recording paper P (position of recording paper P). The controlling part 20 outputs a control signal to the motor controlling circuit 25 and line head controlling circuit 26 based on the signal from the encoder 24.

The motor controlling circuit 25 drives a motor for conveying recording medium 28 based on the output signal from the controlling part 20. The belt drive roller 6 is rotated by driving the motor for conveying recording medium 28, and the conveyor belt 5 is rotated in the clockwise direction of FIG. 1 to convey the recording paper P to the direction of arrow X. At this time, as described above, it is preferred that the controlling part 20 controls the voltage onto the motor for conveying recording medium 28 to rotationally drive the belt drive roller 6 such that the recording medium P is conveyed at a speed of at least 50 m/min.

The line head controlling circuit 26 transfers image data stored in the RAM 23 to the line heads 11C to 11k based on the output signal from the controlling part 20, and controls the ink ejection from the line heads 11C to 11K based on the transferred image data. Image formation on the recording paper P is performed according to the control described above as well as the conveyance control of the recording paper P through the conveyor belt 5 driven by the motor for conveying recording medium 28. Furthermore, when the meniscus vibration described above is performed, the line head controlling circuit 26 controls the meniscus vibration of the line heads 11C to 11K based on the output signal from the controlling part 20.

The voltage controlling circuit 27 produces an alternating electric field by applying a voltage to the belt roller 7 on the paper feed side based on the output signal from the controlling part 20, thereby statically attracting the recording paper P to the conveyor belt 5. The static attraction is released by grounding the belt roller 7 or belt drive roller 6 based on the output signal from the controlling part 20. Here, the voltage is applied to the belt roller 7 on the paper feed side, but the voltage may be applied to the belt drive roller 6 on the paper ejection side.

The method of forming dots using the line head-type ink-jet recording apparatus is specifically explained with reference to FIG. 6. Among the line heads 11C to 11K shown in FIGS. 1 and 2, the line head 11C is explained as an example with reference to FIG. 6; and other line heads 11M to 11K can be explained fairly similarly thereto.

Figure 6:
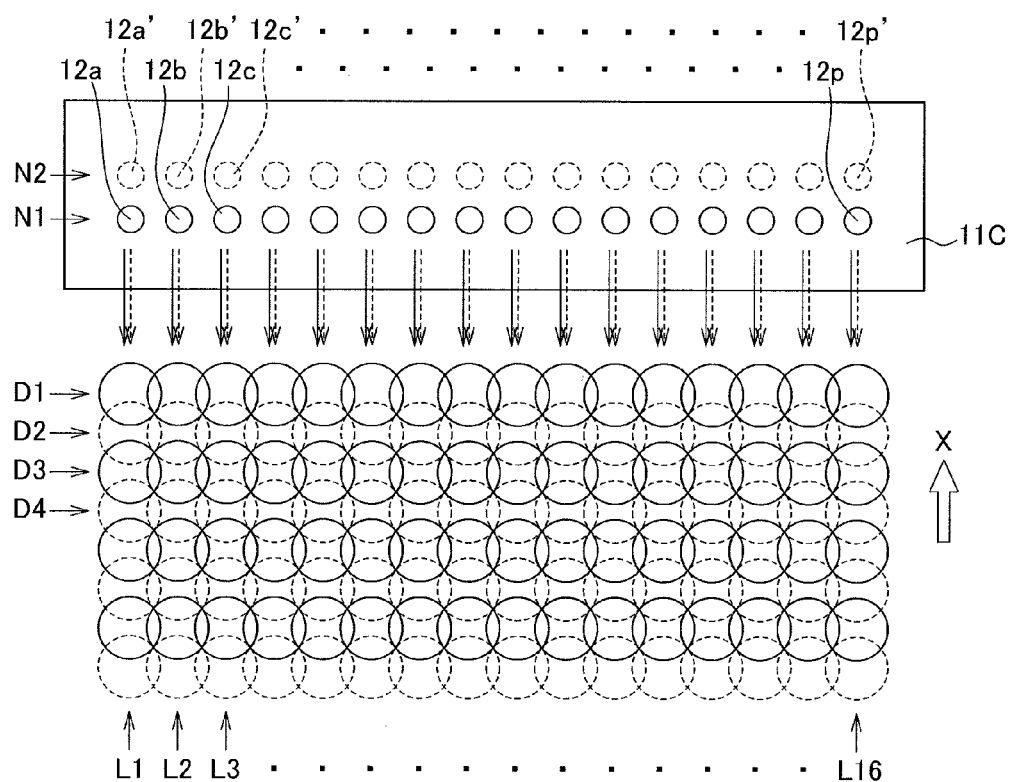
FIG. 6 is a plain view showing a line head used in a line head-type ink-jet recording apparatus and a part of dot lines formed on a recording paper.

As shown in FIG. 6, in the line head 11C, the nozzle arrays N1 and N2 consisting of a plurality of nozzles are arranged in parallel to the paper conveying direction (direction of arrow X). That is, a total of two nozzles are provided to each of the nozzle arrays N1 and N2 (nozzles 12a and 12a' corresponding to a dot array L1) as the nozzles that form dot arrays in the paper conveying direction X. Here, for convenience of explanation, only the 16 nozzles of 12a to 12p and 12a' to 12p' corresponding to the dot arrays L1 to L16 are illustrated among the nozzles of the nozzle arrays N1 and N2; actually, still more nozzles are arranged in a direction perpendicular to the paper conveying direction X.

Images are formed on a recording paper P using the nozzle arrays N1 and N2 in series. After forming the dot array D1 of one line in the width direction (left-right direction in FIG. 6) of the recording paper P by ejecting ink droplets from the nozzle array N1 (solid arrow in FIG. 6) while moving the recording paper P in the paper conveying direction X, a subsequent dot array D2 of one line is formed by ejecting ink droplets from the nozzle array N2 (dotted arrow in FIG. 6), and then a subsequent dot array D3 of one line is further formed by ejecting ink droplets from the nozzle array N1. Thereafter, dot arrays D4 and the following are similarly formed by alternately using the nozzle arrays N1 and N2.

Since the ink of the first embodiment is used in the image forming method of the second embodiment described above, ejection failure of the ink can be suppressed when forming images after the ink was not ejected for a while from recording heads, occurrence of image smear due to flying of satellite drops can be suppressed, viscosity change in cases of exposing the ink to a high-temperature environment for a long time can be suppressed, and occurrence of offset can be suppressed. For this reason, the image forming method of the second embodiment can be suitably employed in various ink-jet recording apparatuses.

EXAMPLES

The present disclosure is explained more specifically with reference to examples below. In addition, the present disclosure is not limited to the examples.

Preparation Example 1

Preparation of Styrene-Acrylic Resin 100 g of isopropyl alcohol and 250 g of methyl ethyl ketone were added to a 1000 mL four-necked flask equipped with a stirrer, a nitrogen-introducing tube, a condenser, and a dropping funnel. A mixture solution of 40 g of methyl methacrylate, 40 g of styrene, 10 g of butyl acrylate, 10 g of methacrylic acid, and 0.3 g of azobisisobutyronitrile (AIBN) as an initiator was poured into the dropping funnel, and the mixture solution was added dropwise into the solvent in the flask under reflux at 70° C. in nitrogen atmosphere over about 2 hours. After the dropwise addition, the reactant in the flask was further heated and refluxed for 6 hours, and a solution of 0.1 g AIBN in 150 g of methyl ethyl ketone was further added dropwise into the flask over 15 minutes. Then, the reactant in the flask was heated and refluxed for 5 hours, thereby obtaining a styrene-acrylic resin with a molecular weight of 20,000 and an acid value of 100 mg KOH/g (resin A). Resins B to G having a molecular weight different from that of resin A were prepared by a method similar to that of resin A except that the solvent amount, the amount of polymerization initiator used, the polymerization temperature, and the polymerization time were appropriately changed. The amount of polymerization initiator used was adjusted within a range of from 0.001 mole to 5 moles per one mole of monomer mixture. The polymerization temperature was adjusted within a range of from 50° C. to 80° C. The polymerization time was adjusted within a range of from 10 hours to 24 hours.

The weight average molecular weight (Mw) of the resulting resins was determined in accordance with the following conditions using gel filtration chromatography (HLC-8020GPC, by Tosoh Co.). The weight average molecular weights of resins A to G are shown in Table 1. Acid values (mg KOH/g) of the resulting resins were also determined by titration. The acid values of the resulting resins A to G are shown in Table 1.

Measurement Conditions of Weight Average Molecular Weight
Column: TSKgel, Super Multipore HZ-H (4.6 mm ID×15 cm, by Tosoh Co.)
Number of columns: 3
Eluent: tetrahydrofuran
Flow rate: 0.35 mL/min
Amount of injected sample: 10 μL
Measurement temperature: 40° C.
Detector: IR detector A calibration curve was prepared on the basis of 8 types of F-40, F-20, F-4, F-1, A-5000, A-2500, A-1000, and n-propylbenzene selected from reference standards (TSK standard, polystyrene, by Tosoh Co.).

TABLE 1

| Resin | Weight average molecular weight (Mw) | Acid value (mgKOH/g) |
|---|---|---|
| A | 20,000 | 100 |
| B | 33,000 | 90 |
| C | 36,000 | 100 |
| D | 53,000 | 110 |
| E | 98,000 | 100 |
| F | 139,000 | 140 |
| G | 143,000 | 155 |

Reference Example 1

The components of pigment dispersion were introduced into a Dyno Mill (by Shinmaru Enterprises Co.) to prepare a mixture of 78.5% by mass of ion-exchange water, 6.0% by mass of resin A, 15% by mass of a cyan pigment (P.B-15:3), and 0.5% by mass of a surfactant (OLFINE E1004, ethylene oxide adduct of acetylenediol, by Nissin Chemical Industry Co.), then zirconia beads with a particle diameter shown in Table 2 were filled into the vessel of the Dyno Mill, followed by processing under the conditions of from 1 to 4 in Table 2 to prepare pigment dispersions. The resin A was neutralized by an aqueous NaOH solution with a neutralization equivalent of 105%. In the calculation, the mass of Na was considered as a mass of resin, and the mass of water in the aqueous NaOH solution and the water resulting from the neutralization reaction were considered as a mass of ion exchange water.

Using the pigment dispersions resulting from the conditions 1 to 4, 40% by mass of each pigment dispersion, 1.0% by mass of a surfactant (OLFINE E1004, ethylene oxide adduct of acetylenediol, by Nissin Chemical Industry Co.), 0.5% by mass of 1,2-octanediol, 10% by mass of 2-pyrrolidone, 10% by mass of glycerin, 8.0% by mass of triethylene glycol monomethyl ether, 20% by mass of 1,3-propanediol, and the remaining ion-exchange water were uniformly mixed using an agitator, followed by filtering through a filter with a pore size of 5 μm, thereby obtaining 4 types of inks. The amounts of glycerin and ion exchange water were appropriately adjusted so that the viscosities of the 4 types of inks were similar. The resulting inks were measured for the adsorbed resin proportion thereof in accordance with the following method.

Method of Measuring Adsorbed Resin Proportion 10 g of an ink was introduced into a predetermined container, and the ink was centrifuged for 24 hours under a condition of rotation number 5,000 rpm, using a centrifuge (NS-C100, by Nano Seeds Co.). After centrifugation thereof, the solid content containing a free resin as a main component was recovered by collecting the entire amount of transparent supernatant of the ink in the container, and drying the supernatant at 150° C. under a reduced pressure of 0.67 Pa. Here, the surfactant in the ink volatilizes under the drying condition. Assuming that the mass of the resulting solid content is the mass of the free resin, the content of the free resin in the ink was calculated. Then, the adsorbed resin proportion was determined from the value of the resulting content of the free resin in accordance with the following formula.

Adsorbed resin proportion=1−(mass of free resin)/(total mass of resin in ink)

TABLE 2

| Dispersion conditions | Condition 1 | Condition 2 | Condition 3 | Condition 4 |
|---|---|---|---|---|
| 1st pass | | | | |
| Diameter of zirconia beads | 1.0 mm | 0.5 mm | 1.0 mm | 1.0 mm |
| Discharge amount (g/min) | 300 | 300 | 300 | 300 |
| 2nd pass | | | | |
| Diameter of zirconia beads | — | — | 1.0 mm | 0.5 mm |
| Discharge amount (g/min) | — | — | 200 | 300 |
| Mass ratio of resin to pigment | 0.4 | 0.4 | 0.4 | 0.4 |
| Amount of resin in ink (% by mass) | 1.8 | 1.8 | 1.8 | 1.8 |
| Amount of free resin in ink (% by mass) | 0.18 | 0.09 | 0.054 | 0.03 |
| Adsorbed resin proportion | 0.900 | 0.950 | 0.970 | 0.983 |

It is understood from Table 2 that the amount of free resin in the ink can be adjusted and thus the adsorbed resin proportion can be adjusted by changing the production conditions of the pigment dispersion such as the diameter of the zirconia beads, the number of processing times, and the discharge amount in the mill such as the Dyno Mill.

Preparation Example 2

Preparation of Pigment Dispersion

P.B-15:3 was used as the cyan pigment. 15% by mass of the pigment, the styrene-acrylic resins of the amount and type shown in Tables 3 and 4, and 0.5% by mass of a surfactant (OLFINE E1004, ethylene oxide adduct of acetylenediol, by Nissin Chemical Industry Co.) based on the total mass of components used in the preparation of the pigment dispersion, and also the remaining water were introduced into the Dyno Mill (Multipurpose laboratory, vessel volume 0.6 L, by Shinmaru Enterprises Co.). Next, potassium hydroxide of an amount necessary to neutralize the styrene-acrylic resin was added to the Dyno Mill. Then, zirconia beads with a diameter of 0.5 mm as a media equivalent to the 70% by volume of the vessel volume were filled into the Dyno Mill, and the pigment and the styrene-acrylic resin were kneaded under the conditions of 10° C., circumferential velocity 8 m/s, and water-cooling. With reference to the method of adjusting the adsorbed resin proportion in the Reference Example 1, the number of processing times and the discharge amount in the Dyno Mill were appropriately changed to obtain the pigment dispersions 1 to 12 having the adsorbed resin proportions in Tables 3 and 4. The resulting pigment dispersions were diluted to 500 times with ion exchange water, and the volume average particle diameters D50 of the pigments were measured by a dynamic light scattering-type particle size distribution analyzer (Zetasizer Nano, by Sysmex Co.); as a result, the volume average particle diameters D50 of the pigments were confirmed to be in the range of from 70 nm to 130 nm.

In addition, the adsorbed resin proportions of pigment dispersions 1 to 12 were determined by the following method. The adsorbed resin proportions of pigment dispersions 1 to 12 are shown in Tables 3 and 4.

Method of Measuring Adsorbed Resin Proportion 10 g of a pigment dispersion was introduced into a predetermined container and centrifuged for 24 hours under a condition of revolution speed 5000 rpm using a centrifuge (NS-C100, by Nano Seeds Co.). After centrifugation thereof, the solid content containing a free resin as a main component was measured by collecting the entire amount of transparent supernatant of ink in the container, and drying the supernatant at 150° C. under a reduced pressure of 0.67 Pa. Here, the surfactant in the pigment dispersion volatilizes when drying at 150° C. Assuming that the mass of the resulting solid content is the mass of the free resin, the content of the free resin in the pigment dispersion was calculated. Next, the adsorbed resin proportion was determined from the value of the resulting content of the free resin in accordance with the following formula.

Adsorbed resin proportion=1−(mass of free resin)/(mass of total resin)

It has been experienced that all of the components other than the pigment dispersions in the inks prepared in the following Examples and Comparative Examples volatilize under the above-mentioned drying conditions. For this reason, the adsorbed resin proportion of the inks prepared in the following Examples and Comparative Examples is equal to the adsorbed resin proportion of the pigment dispersions used in the preparation of inks.

TABLE 3

| Pigment dispersion | | 1 | 2 | 3 | 4 | 5 | 6 | 7 |
|---|---|---|---|---|---|---|---|---|
| Resin | Type | A | B | C | D | E | F | G |
| | Amount used (% by mass) | 6.0 | 6.0 | 7.0 | 6.0 | 5.5 | 5.0 | 5.0 |
| Amount of non-adsorbed resin (% by mass) | | 0.18 | 0.15 | 0.17 | 0.15 | 0.16 | 0.15 | 0.15 |
| Adsorbed resin proportion | | 0.970 | 0.975 | 0.976 | 0.975 | 0.971 | 0.970 | 0.970 |

TABLE 4

| Pigment dispersion | | 8 | 9 | 10 | 11 | 12 |
|---|---|---|---|---|---|---|
| Resin | Type | E | E | E | E | E |
| | Amount used (% by mass) | 6.0 | 6.0 | 6.0 | 6.0 | 5.5 |
| Amount of non-adsorbed resin (% by mass) | | 0.04 | 0.13 | 0.18 | 0.21 | 0.25 |
| Adsorbed resin proportion | | 0.994 | 0.978 | 0.970 | 0.965 | 0.958 |

Examples 1 to 23 and Comparative Examples 1 to 56

Preparation of Ink

Based on the ink compositions a to e shown in Table 5 where the rates of the mass of triethylene glycol monomethyl ether in the ink versus the total amount of the ink are shown, totally 60 types of inks of Examples 1 to 23 and Comparative Examples 1 to 39 were prepared using 12 types of the resulting pigment dispersions.

Specifically, 40% by mass of the resulting pigment dispersions, 1.0% by mass of a surfactant (OLFINE E1004, ethylene oxide adduct of acetylenediol, by Nissin Chemical Industry Co.), 0.5% by mass of 1,2-octanediol, 8% by mass of 2-pyrrolidone, 10% by mass of glycerin, 20% by mass of 1,3-propanediol, and triethylene glycol monomethyl ether at the rates shown in Table 5 based on the total amount of the ink, and also the remaining ion-exchange water were uniformly mixed using an agitator, followed by filtering through a filter with a pore size of 5 μm, thereby obtaining the inks of Examples 1 to 21 and Comparative Examples 1 to 39.

Example 22

The ink of Example 22 was prepared similarly to the inks of Examples 1 to 21 and Comparative Examples 1 to 39 except that 40% by mass of pigment dispersion 4 was used as the pigment dispersion, 1.0% by mass of 2,4-diethyl-1,5-pentanediol was used in place of 1,2-octanediol, and triethylene glycol monomethyl ether was used at the rate of composition c shown in Table 5.

Example 23

The ink of Example 23 was prepared similarly to the inks of Examples 1 to 21 and Comparative Examples 1 to 39 except that 40% by mass of pigment dispersion 5 was used as the pigment dispersion, 1.0% by mass of 2,4-diethyl-1,5-pentanediol was used in place of 1,2-octanediol, and triethylene glycol monomethyl ether was used at the rate of composition d shown in Table 5.

TABLE 5

| | a | b | c | d | e |
|---|---|---|---|---|---|
| Triethylene glycol monomethyl ether (% by mass) | 0.0 | 3.0 | 8.0 | 15.0 | 20.0 |

Examples 24 to 29

The inks of Examples 24 to 26 having the ink composition f like the ink composition c were prepared similarly to the inks of Examples 1 to 21 and Comparative Examples 1 to 39 except that 8.0% by mass of triethylene glycol monobutyl ether based on the total amount of the ink was used in place of triethylene glycol monomethyl ether and the pigment dispersions shown in Table 8 were used. The inks of Examples 27 to 29 having the ink composition g like the ink composition c were also prepared similarly to the inks of Examples 1 to 21 and Comparative Examples 1 to 39 except that 8.0% by mass of tripropylene glycol monomethyl ether based on the total amount of the ink was used in place of triethylene glycol monomethyl ether and the pigment dispersions of the types shown in Table 8 were used.

Evaluation

The inks of Examples 1 to 21 and Comparative Examples 1 to 39 were evaluated with respect to intermittent ejection property, satellite, and storage stability by the methods below. The inks of Examples 24 to 29 were evaluated with respect to intermittent ejection property by the method below. The evaluation results of intermittent ejection property, satellite, and storage stability of the inks of Examples 1 to 21 and Comparative Examples 1 to 39 are shown in Tables 6 and 7. The evaluation results of intermittent ejection property of the inks of Examples 24 to 29 and also the evaluation results of intermittent ejection property of the inks of Examples 2, 5, and 8 are shown in Table 8.

Offset property was also evaluated for the inks of Examples 2, 5, 8, 11 and Comparative Example 8. The evaluation results of offset property are shown in Table 9.

Method of Evaluating Intermittent Ejection Property

The intermittent ejection property is an index that shows a level resistant to cause ejection failure of an ink when forming images after the ink was not ejected for a while from recording heads. The evaluation of the intermittent ejection property was performed by an image forming apparatus (test model, by Kyocera Mita Co.) with a recording head that has a heater capable of warming a head inside and can detect a temperature of the head inside under an environment of 10° C. and 15% RH with setting the temperature of the warmed head to 25° C. An ink was filled into the recording head, and a redundant liquid out of a nozzle forming surface was scraped off by a wipe blade. A glossy paper (photographic glossy paper, KA4100PGP, by Seiko Epson Co.) was used as a recording medium (recording paper P). Specifically, an ink was ejected from the recording head such that the amount of ink landed onto the recording medium was 7.0 g/m² and a line image 1 was formed along a longitudinal direction of the head, then after 30 minutes, a meniscus vibration was induced 1000 times before forming an image on the recording medium, then the meniscus vibration was further induced 10 times after an arbitrary non-image forming interval, followed by immediately forming a line image 2. The condition of the resulting image of the line image 2 was observed using a microscope to evaluate the intermittent ejection property. Evaluation criteria of the intermittent ejection property are shown below.

Very good: even when the non-image forming interval longer than the interval corresponding to the longitudinal of A3 paper is provided between the line image 1 and the line image 2, no disturbance occurs in the line image 2;

Good: no disturbance occurs in the line image 2 until the non-image forming interval corresponding to the longitudinal of A3 size paper; and Bad: disturbance occurs in the line image 2 at the non-image forming interval corresponding to the longitudinal of A3 size paper.

Method of Evaluating Satellite

The satellite was evaluated using the image forming apparatus, used for evaluating the intermittent ejection property, under an environment of 25° C. and 60% RH with setting the temperature of the warmed head to 25° C. An ink was filled into the recording head, and a redundant liquid out of a nozzle forming surface was scraped off by a wipe blade. The distance between a nozzle forming surface of the recording head and the recording paper P was fixed to 1 mm, and the conveying speed of the recording paper P from the paper feed portion to the paper discharge portion was set to 50 m/min. glossy paper (photographic glossy paper, KA4100PGP, by Seiko Epson Co.) was used as a recording medium (recording paper P), and an ink was ejected from the recording head such that the amount of ink landed onto the recording medium was 7 g/m². On one sheet of the recording medium, a line image (width of one dot×length in which images can be formed within the width of the recording medium) vertical to the moving direction of the recording medium was repeatedly formed per one space corresponding to the width of 9 dots (per non-image forming interval). Among the resulting two or more line images, an arbitrary line image was observed by a microscope to evaluate the satellite in accordance with the criteria below.

Very good: non-distorted one-line image is formed;

Good: elliptical dots and/or satellite drops have flown, and line images are distorted due to the dots formed by connecting the dots resulting from landing of main drops and the dots resulting from landing of satellite drops; and Bad: satellite drops have flown, and the dots resulting from landing of main drops and the dots resulting from landing of satellite drops are separately formed to produce double line images.

Method of Evaluating Storage Stability

The storage stability is an index that shows a level resistant to cause viscosity change of an ink after the ink is exposed under a high-temperature environment for a long time. An ink of 60 mL, which had been measured for an initial viscosity $V^1$, was introduced into a container of volume 90 mL, and the container with the ink was placed in a constant temperature oven of inner temperature 60° C., then allowed to stand for one month. Then, under an environment of 25° C., a post-storage viscosity $V^2$ of the ink in the container was measured, and a viscosity change rate was determined from the initial viscosity $V^1$ and the post-storage viscosity $V^2$ by the formula below, and the result thereof was evaluated in accordance with the criteria below. The viscosity of the ink was measured using an oscillation-type viscometer (VM-200T, by Nittetsu Hokkaido Control Systems). Viscosity Change Rate(%)=$|((V^1-V^2)/V^1)|\times 100$ Very good: viscosity change rate is less than 2%;

Good: viscosity change rate is from 2% to 5%; and

Bad: viscosity change rate is greater than 5%.

Method of Evaluating Offset Property

The offset property was evaluated using the image forming apparatus, used for evaluating the intermittent ejection property, under an environment of 10° C. and 80% RH with setting the temperature of the warmed head to 25° C. After filling an ink into the recording head, a redundant liquid out of a nozzle forming surface was scraped off by a wipe blade. The distance between a nozzle forming surface of the recording head and the recording paper was set to 1 mm. Only a cyan color ink was ejected to form solid images successively on 10 sheets of the recording medium (recording paper P) while setting an amount of ink landed onto the recording medium per color to 3 g/m², 7 g/m², or 11 g/m², respectively. The successively image-formed 10th sheet was evaluated for the offset property by observing the condition of non-image-formed portions of the recording medium after contacting a driven roller 8b (diameter 16 mm), which is provided at a discharging portion, to discharge the recording medium and of which surface material is polytetrafluoroethylene (PTFE) resin, and the state of the ink adhered to the driven roller 8b. Evaluation criteria of the offset property are shown below.

Here, the linear pressure (gf/mm) occurring between the driven roller 8b and the discharge roller 8a (surface material: ethylene propylene diene rubber (EPDM), diameter: 25 mm) can be adjusted by a spring provided between a shaft of the driven roller and its supporting member.

Very good: no image is printed on non-image-formed portions even when the linear pressure is 25 gf/mm;

Good: images, are printed on non-image-formed portions when the linear pressure is 25 gf/mm, but no image is printed on non-image-formed portions when the linear pressure is 15 gf/mm; and Bad: images are printed on non-image-formed portions even when the linear pressure is 15 gf/mm.

The conveying speed of recording media was set to 50 m/min in the ink-jet recording apparatus. Sheets prepared by cutting a paper (IJW, by Oji Paper Co.) into A4 size were used as the recording media. The size of images formed on the recording media was 10×10 cm.

TABLE 6

| Type of pigment dispersion | Composition of ink | | Intermittent ejection property | Satellite | Storage stability |
|---|---|---|---|---|---|
| 1 | a | Comp. ex. 1 | Bad | Good | Bad |
|   | b | Comp. ex. 2 | Good | Good | Bad |
|   | c | Comp. ex. 3 | Very good | Good | Bad |
|   | d | Comp. ex. 4 | Very good | Good | Bad |
|   | e | Comp. ex. 5 | Very good | Good | Bad |
| 2 | a | Comp. ex. 6 | Bad | Good | Bad |
|   | b | Comp. ex. 7 | Good | Good | Bad |
|   | c | Comp. ex. 8 | Very good | Good | Bad |
|   | d | Comp. ex. 9 | Very good | Good | Bad |
|   | e | Comp. ex. 10 | Very good | Good | Bad |
| 3 | a | Comp. ex. 11 | Bad | Good | Very good |
|   | b | Ex. 1 | Good | Good | Good |
|   | c | Ex. 2 | Very good | Good | Good |
|   | d | Ex. 3 | Very good | Good | Good |
|   | e | Comp. ex. 12 | Very good | Good | Bad |
| 4 | a | Comp. ex. 13 | Bad | Good | Very good |
|   | b | Ex. 4 | Good | Good | Good |
|   | c | Ex. 5 | Good | Good | Good |
|   | d | Ex. 6 | Very good | Good | Good |
|   | e | Comp. ex. 14 | Very good | Good | Bad |
| 5 | a | Comp. ex. 15 | Bad | Good | Very good |
|   | b | Ex. 7 | Good | Good | Very good |
|   | c | Ex. 8 | Good | Good | Good |
|   | d | Ex. 9 | Good | Good | Good |
|   | e | Comp. ex. 16 | Very good | Good | Bad |
| 6 | a | Comp. ex. 17 | Bad | Good | Very good |
|   | b | Ex. 10 | Good | Good | Very good |
|   | c | Ex. 11 | Good | Good | Good |
|   | d | Ex. 12 | Good | Good | Good |
|   | e | Comp. ex. 18 | Good | Good | Bad |

TABLE 6-continued

| Type of pigment dispersion | Composition of ink | | Intermittent ejection property | Satellite | Storage stability |
|---|---|---|---|---|---|
| 7 | a | Comp. ex. 19 | Bad | Good | Very good |
|   | b | Comp. ex. 20 | Bad | Good | Very good |
|   | c | Comp. ex. 21 | Bad | Good | Good |
|   | d | Comp. ex. 22 | Bad | Good | Good |
|   | e | Comp. ex. 23 | Bad | Good | Bad |

TABLE 7

| Type of pigment dispersion | Composition of ink | | Intermittent ejection property | Satellite | Storage stability |
|---|---|---|---|---|---|
| 8 | a | Comp. ex. 24 | Bad | Very good | Very good |
|   | b | Ex. 13 | Good | Very good | Very good |
|   | c | Ex. 14 | Good | Very good | Good |
|   | d | Ex. 15 | Good | Very good | Good |
|   | e | Comp. ex. 25 | Very good | Very good | Bad |
| 9 | a | Comp. ex. 26 | Bad | Very good | Very good |
|   | b | Ex. 16 | Good | Very good | Very good |
|   | c | Ex. 17 | Good | Good | Good |
|   | d | Ex. 18 | Good | Good | Good |
|   | e | Comp. ex. 27 | Very good | Good | Bad |
| 10 | a | Comp. ex. 28 | Bad | Good | Very good |
|    | b | Ex. 19 | Good | Good | Very good |
|    | c | Ex. 20 | Good | Good | Good |
|    | d | Ex. 21 | Good | Good | Good |
|    | e | Comp. ex. 29 | Very good | Good | Bad |
| 11 | a | Comp. ex. 30 | Bad | Bad | Very good |
|    | b | Comp. ex. 31 | Good | Bad | Very good |
|    | c | Comp. ex. 32 | Good | Bad | Good |
|    | d | Comp. ex. 33 | Good | Bad | Good |
|    | e | Comp. ex. 34 | Very good | Bad | Bad |
| 12 | a | Comp. ex. 35 | Bad | Bad | Very good |
|    | b | Comp. ex. 36 | Good | Bad | Very good |
|    | c | Comp. ex. 37 | Good | Bad | Good |
|    | d | Comp. ex. 38 | Good | Bad | Good |
|    | e | Comp. ex. 39 | Very good | Bad | Bad |
| 4 | c | Ex. 22 | Good | Good | Good |
| 5 | d | Ex. 23 | Good | Good | Good |

It is understood from Tables 6 and 7 that ejection failure of the ink when forming images after the ink was not ejected for a while from recording heads, occurrence of image smear due to flying of satellite drops, and viscosity change in cases of exposing the ink to a high-temperature environment for a long time can be suppressed in cases of the ink containing water, a pigment, a resin, an organic solvent, and a humectant, in which the resin has a weight average molecular weight of from 35,000 to 140,000 (resins C to F), the adsorbed resin proportion is at least 0.97 (pigment dispersions 1 to 7), and the content of C1-C4 monoalkyl ether of polyhydric alcohol is from 3% to 15% by mass based on the mass of the ink (ink compositions b to d, f and g).

In contrast, it is understood that ejection failure of the ink is unlikely to be suppressed when forming images after the ink was not ejected for a while from recording heads, when the content of C1-C4 monoalkyl ether of polyhydric alcohol is less than 3% by mass. On the other hand, it is understood that, when the weight average molecular weight of the resin is greater than 140,000, ejection failure of the ink is unlikely to be suppressed when forming images after the ink was not ejected for a while from recording heads even when the content of C1-C4 monoalkyl ether of polyhydric alcohol is from 3% to 15% by mass.

It is also understood that occurrence of image smear due to flying of satellite drops is unlikely to be suppressed when the adsorbed resin proportion of the ink is less than 0.97.

It is also understood that viscosity change of the ink in cases of exposing the ink to a high-temperature environment for a long time cannot be suppressed when the content of C1-C4 monoalkyl ether of polyhydric alcohol of the ink is greater than 15% by mass. On the other hand, it is understood that, when the weight average molecular weight of the resin is less than 35,000, viscosity change of the ink in cases of exposing the ink to a high-temperature environment for a long time cannot be suppressed even when the content of C1-C4 monoalkyl ether of polyhydric alcohol is from 3% to 15% by mass.

TABLE 8

| Type of pigment dispersion | Composition of ink | | Intermittent ejection property |
|---|---|---|---|
| 3 | c | Ex. 2 | Very good |
| 4 | | Ex. 2 | Good |
| 5 | | Ex. 8 | Good |
| 3 | f | Ex. 24 | Good |
| 4 | | Ex. 25 | Good |
| 5 | | Ex. 26 | Good |
| 3 | g | Ex. 27 | Good |
| 4 | | Ex. 28 | Good |
| 5 | | Ex. 29 | Good |

It is understood from Table 8 that, with respect to the ink that contains water, a pigment, a resin, an organic solvent, and a humectant, in which the resin has a molecular weight of from 35,000 to 140,000, the adsorbed resin proportion is at least 0.97, and the content of C1-C4 monoalkyl ether of polyhydric alcohol is from 3% to 15% by mass based on the mass of the ink, ejection failure of the ink when forming images after the ink was not ejected for a while from recording heads can be suppressed when the C1-C4 monoalkyl ether of polyhydric alcohol is at least one selected from triethylene glycol monobutyl ether, triethylene glycol monomethyl ether, and tripropylene glycol monomethyl ether.

TABLE 9

| Type of pigment dispersion | Composition of ink | Landing amount (g/m$^2$) | | |
|---|---|---|---|---|
| | | 3 | 7 | 11 |
| 2 | c Comp. Ex. 8 | Good | Good | Bad |
| 3 | Ex. 2 | Good | Good | Bad |
| 4 | Ex. 5 | Very good | Good | Bad |
| 5 | Ex. 8 | Very good | Good | Bad |
| 6 | Ex. 11 | Very good | Very good | Bad |

It is understood from Table 9 that, when the amount of landed ink is 7.0 g/m$^2$ or less, occurrence of offset can be appropriately suppressed by using the ink that contains water, a pigment, a resin, an organic solvent, and a humectant, in which the resin has a molecular weight of from 35,000 to 140,000 (resins C to F), the adsorbed resin proportion is at least 0.97 (pigment dispersions 1 to 7), and the content of C1-C4 monoalkyl ether of polyhydric alcohol is from 3% to 15% by mass based on the mass of the ink (ink compositions b to d, f, and g). On the other hand, it is understood that, when the amount of landed ink is greater than 7.0 g/m$^2$, occurrence of offset cannot be suppressed even when using the ink contains water, a pigment, a resin, an organic solvent, and a humectant, the resin has a molecular weight of from 35,000 to 140,000, the adsorbed resin proportion is at least 0.97, and the content of C1-C4 monoalkyl ether of polyhydric alcohol is from 3% to 15% by mass based on the mass of the ink.

What is claimed is:

1. An ink for an ink-jet recording apparatus, comprising water, a pigment dispersion, an organic solvent, and a humectant,
    wherein the pigment dispersion comprises a pigment and a resin having a weight average molecular weight from about 35,000 to about 140,000,
    an adsorbed resin proportion, determined in accordance with the following formula from a mass of a total amount of resin in the ink and an amount of resin separated from pigment among the resin, is at least 0.97:

Adsorbed resin proportion=1−(mass of free resin)/(mass of total resin), and the ink contains as the organic solvent from 3% to 15% by mass of C1-C4 monoalkyl ether of polyhydric alcohol based on a mass of the ink.

2. The ink for an ink-jet recording apparatus according to claim 1, wherein the humectant comprises glycerin and 1,3-propanediol.

3. The ink for an ink-jet recording apparatus according to claim 1, wherein the C1-C4 monoalkyl ether of polyhydric alcohol comprises at least one selected from the group consisting of triethylene glycol monobutyl ether, triethylene glycol monomethyl ether, and tripropylene glycol monomethyl ether.

4. A method of forming an image comprising:
    providing the ink according to claim 1 to an ink-jet recording apparatus; and
    forming the image with the ink-jet recording apparatus using the ink.

5. The method according to claim 4, wherein the ink-jet recording apparatus comprises a line head-type recording head, a recording medium is conveyed at a speed of at least 50 m/min, and an amount of the ink ejected per recording medium is 7 g/m$^2$ or less.

6. The method according to claim 4, wherein droplets are ejected from a recording head of the ink-jet recording apparatus as a result of a pressure occurring in a liquid chamber by controlling a voltage applied to a piezoelectric element, and the recording system is a line head-type recording system.

7. The method according to claim 6, wherein a controller of the ink-jet recording apparatus performs a meniscus vibration such that an ink meniscus near an ink ejection hole is vibrated one or more times at a level less than ejection by controlling the voltage applied to the piezoelectric element.

8. The method according to claim 7, wherein the meniscus vibration is performed before ejecting the ink to the recording medium.

* * * * *